United States Patent
Wockatz et al.

(10) Patent No.: US 11,148,371 B2
(45) Date of Patent: Oct. 19, 2021

(54) TEXTILE SUBSTRATE MADE OF REINFORCEMENT FIBERS

(71) Applicant: TOHO TENAX EUROPE GMBH, Wuppertal (DE)

(72) Inventors: Ronny Wockatz, Düsseldorf (DE); Dirk Ortmanns, Wegberg (DE)

(73) Assignee: TOHO TENAX EUROPE GMBH, Wuppertal (DE)

( * ) Notice: Subject to any disclaimer, the term of this patent is extended or adjusted under 35 U.S.C. 154(b) by 80 days.

(21) Appl. No.: 15/763,545

(22) PCT Filed: Sep. 6, 2016

(86) PCT No.: PCT/EP2016/070959
§ 371 (c)(1),
(2) Date: Mar. 27, 2018

(87) PCT Pub. No.: WO2017/055025
PCT Pub. Date: Apr. 6, 2017

(65) Prior Publication Data
US 2018/0272626 A1    Sep. 27, 2018

(30) Foreign Application Priority Data
Oct. 1, 2015 (EP) .................................. 15187861

(51) Int. Cl.
| B29C 70/22 | (2006.01) |
| D04H 1/559 | (2012.01) |
| D04H 3/04 | (2012.01) |
| D04H 3/115 | (2012.01) |
| D04H 3/14 | (2012.01) |
| D04H 1/541 | (2012.01) |
| B29C 70/12 | (2006.01) |
| B32B 1/00 | (2006.01) |
| B32B 5/02 | (2006.01) |
| B32B 5/26 | (2006.01) |
| B32B 7/12 | (2006.01) |
| B29B 11/16 | (2006.01) |

(52) U.S. Cl.
CPC ............ *B29C 70/226* (2013.01); *B29C 70/12* (2013.01); *B32B 1/00* (2013.01); *B32B 5/022* (2013.01); *B32B 5/26* (2013.01); *B32B 7/12* (2013.01); *D04H 1/5412* (2020.05); *D04H 1/559* (2013.01); *D04H 3/04* (2013.01); *D04H 3/115* (2013.01); *D04H 3/14* (2013.01); *B29B 11/16* (2013.01); *B32B 2260/023* (2013.01); *B32B 2260/046* (2013.01); *B32B 2262/02* (2013.01); *B32B 2262/0261* (2013.01); *B32B 2262/0276* (2013.01); *B32B 2262/101* (2013.01)

(58) Field of Classification Search
CPC ......... B29C 70/226; D04H 1/559; D04H 3/04
USPC .......................................................... 428/196
See application file for complete search history.

(56) References Cited

U.S. PATENT DOCUMENTS

| 3,700,544 | A   | * | 10/1972 | Matsui ..................... D01D 5/34 428/373 |
| 6,995,099 | B1  | * | 2/2006  | Nishimura ............. B29C 70/083 442/59 |
| 2003/0180514 | A1 | * | 9/2003  | Baudonnel ............ B29C 70/083 428/292.1 |
| 2006/0154020 | A1 | * | 7/2006  | Kasuya .................... D04H 3/04 428/105 |
| 2010/0285265 | A1 | * | 11/2010 | Shinoda .................. B29B 11/16 428/80 |
| 2012/0202004 | A1 |   | 8/2012  | Beraud et al. |
| 2012/0270454 | A1 | * | 10/2012 | Chiou .................... D04H 1/645 442/172 |

FOREIGN PATENT DOCUMENTS

| EP | 1125728 A1 | 8/2001 |
| EP | 1348791 A1 | 10/2003 |
| EP | 1669486 A1 | 6/2006 |
| JP | 2003-080607 A | 3/2003 |
| JP | 2003-082117 A | 3/2003 |
| WO | 99/44810 A1 | 9/1999 |
| WO | 02/04725 A1 | 1/2002 |
| WO | 2007/015706 A1 | 2/2007 |

OTHER PUBLICATIONS

Dec. 12, 2016 Search Report issued in International Patent Application No. PCT/EP2016/070959.

* cited by examiner

*Primary Examiner* — Peter Y Choi
(74) *Attorney, Agent, or Firm* — Oliff PLC

(57) ABSTRACT

A textile substrate made from reinforcing fibers for the production of composite-material preforms, Including an unidirectional composite consisting of at least one flat layer of multifilament reinforcing yarns arranged alongside and parallel to one another and joined by transverse threads, whereby a nonwoven of thermoplastic polymer material is arranged on the at least one flat layer of multifilament reinforcing yarns and is adhesively bonded to the flat layer of multifilament reinforcing yarns. The textile substrate wherein the transverse threads have a core/sheath structure with a first component forming the sheath and a second component forming the core, wherein the first component has a lower melting point than the second component, the first component is a fusible thermoplastic polymer material and the multifilament reinforcing yarns arranged alongside one another are joined together via the first component of the transverse threads by meltbonding.

19 Claims, No Drawings

TEXTILE SUBSTRATE MADE OF REINFORCEMENT FIBERS

The invention relates to a textile substrate made from reinforcing fibers for the production of composite-material preforms that comprises a fiber composite or a unidirectional woven fabric consisting of at least one flat layer of multifilament reinforcing yarns arranged alongside and parallel to one another that are joined by transverse threads, whereby a nonwoven of thermoplastic polymer material is arranged on the at least one flat layer of multifilament reinforcing yarns and is adhesively bonded to the flat layer of the multifilament reinforcing yarns.

Fiber composites made from reinforcing fibers or yarns, in particular also in the form of unidirectional woven fabrics, have long been known on the market. These fiber composites or unidirectional woven fabrics are widely used for the production of composite parts with in some cases complex structures. In an intermediate step during the manufacture of such composite parts, fiber preforms are first produced from fiber composites or unidirectional woven fabrics, the preforms consisting of textile intermediates in the form of two or three-dimensional structures made from reinforcing fibers whose form can already correspond closely to the form of the finished part. For embodiments of fiber preforms of this type that consist substantially only of the reinforcing fibers and for which the matrix percentage required for the production of the part is still absent to a large extent, a suitable matrix material is incorporated in the fiber preform in additional steps via infusion or injection, or also by application of vacuum. Subsequently the matrix material is cured as a rule at increased temperatures and pressures to form the finished component. Known methods for infusion or injection of the matrix material in this case are the so-called liquid molding (LM) method, or methods related thereto such as resin transfer molding (RTM), vacuum assisted resin transfer molding (VARTM), resin film infusion (RFI), liquid resin infusion (LRI), or resin infusion flexible tooling (RIFT).

For production of the fiber preforms, the fiber composites or unidirectional woven fabrics can be stacked on top of one another in several layers without matrix material in a form or mold adapted to the part contour until the desired thickness is obtained. In other cases, several layers of fiber composites or woven fabrics can first be arranged on top of one another and joined together to form a dry multiaxial composite, e.g. by means of sewing threads. The reinforcing fibers of the individual layers can be arranged parallel to one another or alternately crossing. Usually angles of 0°, 90°, plus or minus 25°, plus or minus 30°, plus or minus 45°, or plus or minus 60° are set for multiaxial composites, and the structure is selected such that a symmetrical structure with respect to the zero-degree direction results. These multiaxial composites can then be easily further processed to produce preforms.

In many cases multiaxial composites have a thermoplastic polymer component with a relatively low melting point, e.g. in the form of sewing threads, or in the form of an additional polymer material applied to the multifilament reinforcing yarns. During production of the preform, the preform can be reinforced and hence stabilized by melting of this polymer component and subsequent cooling.

Use of composites made from multifilament reinforcing yarns arranged alongside and parallel to one another, or of unidirectional woven fabrics, allows the production of fiber composite parts that can be selectively adapted to the loads acting on the part during the application, and hence with high strengths in the respective loading directions. The use of multiaxial composites also enables low specific weights to be achieved by adaptation of the fiber densities and fiber angles to the load directions present in the part.

For the production of the preforms it is important that the starting materials used, such as the composites made from multifilament reinforcing yarns arranged alongside and parallel to one another or the unidirectional woven fabrics, but also the multiaxial composites made from them, have sufficient stability and shapeability to ensure good handling and drapeability.

EP 1 352 118 A1, for example, discloses multiaxial composites for which the layers of the reinforcing fibers are held together by means of fusible sewing yarns, which enable a good shapeability of the multiaxial composites above the melting point of the sewing threads and a stabilization of the shape during subsequent cooling. Sewing threads made from thermoplastic polymers such as polyamide or polyester are often used, as is disclosed in EP 1 057 605 for example.

A preproduct for a composite material preform is described in US 2005/0164578, said preproduct having at least one layer made from a reinforcing fiber woven fabric and in which fibers are integrated into at least one of the layers that stabilize the preform when the fibers are subjected to increased temperatures and that dissolve in the matrix resin introduced later for the production of the composite part. WO 02/16481 also discloses structures made from reinforcement fibers for e.g. preforms, wherein the structures contain flexible polymer elements which are e.g. introduced in the form of fibers between the reinforcement fibers or as sewing threads that connect the reinforcement fibers with each other. The flexible polymer elements consist of a material that is soluble in the hardenable matrix material used.

According to DE 198 09 264 A1, adhesive nonwovens made from thermoplastic polymers can be inserted between the layers of reinforcement fibers of the fiber composite arrangements disclosed therein for fiber preforms, the layers being sewn together. Due to these meltbonded nonwovens, the fiber composite arrangements can be shaped in a simple way, when heated above the melting point of the polymer forming these nonwovens, into three-dimensional structures which maintain their shape after cooling, practically without reset forces.

EP 1 473 132 has as its subject matter multiaxial composites and a method for the production of said multiaxial composites as well as the preforms produced from the multiaxial composites. The multiaxial composites therein have intermediate layers made from thermoplastic fibers between the layers made from reinforcement fibers laid unidirectionally, wherein the intermediate layers can be nonwovens made from bi-component fibers or hybrid nonwovens made from different fibers mixed together. The polymer forming the intermediate layers should be compatible with the matrix resin injected later in the preform. It is especially explained that the intermediate layers should be permeable for the matrix resin during the resin infusion and should secure the reinforcement layers during and after the resin infusion. In the case of use of epoxy resins, the nonwovens are made from polyamide fibers. The nonwovens can be connected to the layers made from reinforcement fibers via knitted stitches or via meltbonding.

EP 1 705 269 discloses a thermoplastic fiber material made from a polyhydroxy ether, which e.g. can be used, in the case of multiaxial composites made from reinforcement fibers, as e.g. a nonwoven between the layers made from reinforcement fibers. Under application of heat, the polyhydroxy ether material becomes viscous and sticky, such that a fixation of the reinforcement fibers in a defined geometric arrangement can be achieved prior to their embedding in the matrix. The polyhydroxy ether fiber material then later dissolves completely in the matrix material at a temperature above its glass transition temperature.

Composites made from a plurality of layers of reinforcement fibers are described in US 2006/0252334, which contain e.g. nonwovens made from polymer fibers between the reinforcement layers to improve the impact strength of the parts produced from these composites. These polymer fibers should thereby be soluble in the matrix resin, by which means according to the statements of US 2006/0252334 a more uniform distribution of the polymer forming these fibers in the resin matrix is enabled by comparison with meltable, insoluble thermoplastics.

Because the polymer fibers for the composites of US 2006/0252334 and EP 1 705 269 are soluble in the matrix material and as a result dissolve during the infiltration of the composites with matrix resin, a secure fixation of the reinforcement layers in this stage of the part production is not sufficiently guaranteed.

Descriptions of substrates in the form of single-layer composites made from multifilament reinforcing yarns arranged alongside and parallel to one another, or single-layer unidirectional woven fabrics, that are suitable for the production of fiber preforms are also found in the patent literature. For example, EP 1 408 152 describes a substrate in the form of a unidirectional woven fabric in which multifilament reinforcing yarns arranged unidirectionally and parallel to one another are woven together by auxiliary threads running transversely to the multifilament reinforcing yarns. The auxiliary threads can be carbon fibers, glass fibers, or organic fibers such as aramid, polyamide, PBO, PVA or polyethylene fibers. The substrates described in EP 1 408 152 can also have an adhesive component, e.g. made from a nylon or a polyester or from a hardenable resin such as an epoxy, phenol or unsaturated polyester resin. Furthermore, first and second resin components are bonded to the multifilament yarns of the unidirectional woven fabric. The second resin component has a higher melting point or flow starting temperature than the first resin component.

EP 2 233 625 discloses substrates in the form of single-layer composites, made from reinforcing fiber yarns arranged alongside one another, which have a curved contour and in which the reinforcing fiber yarns are held together by auxiliary threads which intersect the reinforcing fiber yarns in the form of weft threads. Nylon or glass threads are preferably used as auxiliary threads, whereby glass threads are particularly preferred since they do not shrink. A resin material whose main component is a thermoplastic polymer can be applied to the substrate pointwise, in linear form, in discontinuous form or in the form of a nonwoven and adhesively bonded to the substrate in order to stabilize the curved form.

Although EP 2 233 625 already provides substrates exhibiting cohesion and a good stability even with curved contours, there is nevertheless a need for substrates with improved stability and at the same time high drapeability that are suitable for an automated production method and automated processing into preforms.

The underlying object of the present invention is therefore to provide substrates of this type. A further object is to provide substrates based on reinforcing fibers that have good dimensional stability after shaping into preforms as well as good permeability during the infiltration of matrix resins. At the same time, the components produced from these composites should possess high strength properties, in particular under application of pressure, and a high impact strength.

The object is achieved with a textile substrate made from reinforcing fibers for the production of composite-material preforms comprising a unidirectional composite consisting of at least one flat layer of multifilament reinforcing yarns arranged alongside and parallel to one another, wherein the multifilament reinforcing yarns arranged alongside one another are joined together by transverse threads and wherein a nonwoven of thermoplastic polymer material is arranged on the at least one flat layer of multifilament reinforcing yarns and is adhesively bonded to the flat layer of multifilament reinforcing yarns, wherein the substrate is characterized by the fact that the transverse threads have a core/sheath structure with a first component forming the sheath and a second component forming the core, wherein the first component has a lower melting point than the second component, the first component is a fusible thermoplastic polymer material, and the multifilament reinforcing yarns arranged alongside one another are joined together via the first component of the transverse threads by meltbonding.

In the context of the present invention, a unidirectional composite is understood as an arrangement of at least one flat layer of multifilament reinforcing yarns arranged alongside and parallel to one another in which all the reinforcing yarns are oriented in one direction. In the present unidirectional composites, the reinforcing yarns are joined together by the transverse threads by meltbonding, wherein the transverse threads run above or below the flat layer of multifilament reinforcing yarns arranged alongside and parallel to one another and are laid above or below the respective layer and can be bonded to the reinforcing yarns of the layer. The multifilament reinforcing yarns arranged alongside and parallel to one another can also be woven or knitted together by means of the transverse threads, and at the same time can be joined to the transverse threads by meltbonding. The unidirectional composites of the present textile substrate therefore also comprise unidirectional woven fabrics in which all the reinforcing yarns are also oriented in one direction. For these unidirectional woven fabrics, the reinforcement yarns arranged parallel to each other and forming the layer in each case are connected to each other by chains of loose binding threads which extend essentially transverse to the reinforcement yarns. Such unidirectional woven fabrics are described, for example, in EP 0 193 479 B1, EP 0 672 776 or EP 2 233 625. The unidirectional composite preferably has a single flat layer of multifilament reinforcing yarns arranged alongside and parallel to one another.

The present textile substrates have a high stability against shifting of the reinforcing yarns with respect to one another, both in the longitudinal direction of the reinforcing yarns and transvers to the reinforcing yarns. This is attributable on the one hand to the fact that the nonwoven of thermoplastic polymer material is adhesively bonded to the layer of the multifilament reinforcing yarns. On the other hand, the transverse threads with a core/sheath structure result in a further stabilization, since the first component forming the sheath and made of a fusible thermoplastic polymer material with a lower melting point than the second component forming the core results in the multifilament reinforcing yarns arranged alongside one another being joined together by meltbonding.

At the same time, the core component with the higher melting point gives the substrate sufficient transverse stability with respect to both possible shrinkage and with respect to a possible elongation even at the higher temperatures occurring, for example, during the hardening of the matrix resins during the production of composite-material parts from the inventive textile substrate.

The present textile substrate is very suitable for the production of fiber preforms wherein several layers of the textile substrate are superimposed according to the strength requirements of the composite-material part to be ultimately produced and placed e.g. into a form or mold. In view of the good drapeability of the present textile substrate, fiber preforms with curved contours can also be produced by this method. The layers of the textile substrate placed on top of one another can then be joined together, i.e. fixed, for example, via the nonwoven or the sheath component of the transverse threads by means of a brief increase in temperature and subsequent cooling so that a stable and manageable fiber preform is obtained.

As already explained, the first component forming the sheath of the transverse threads has a lower melting point than that of the second component forming the core. The melting point of the first component of the transverse threads preferably lies in the range of 70 to 150° C., and more preferably in the range of 80 to 120° C. The first component can be a polymer or a polymer blend whose melting point lies in this range. Particularly preferably the first component is made from a polyamide homopolymer or a polyamide copolymer or a blend of polyamide homopolymers and/or polyamide copolymers. Of these polymers, polyamide 6, polyamide 6,6, polyamide 6,12, polyamide 4,6, polyamide 11, polyamide 12 or a polymer based on polyamide 6/12 are particularly suitable.

It is also preferable for the second component of the transverse threads to have a melting point above 200° C. The second component is particularly preferably a glass or a polyester, since these materials have a low shrinkage and low elongation at the temperatures prevailing during the production of the composite-material part.

In the present textile substrate, the reinforcing fibers or yarns generally used for the production of fiber-reinforced composite materials can be used as multifilament reinforcing yarns. Preferably, the multifilament reinforcement yarns are carbon fiber, glass fiber, or aramid yarns, or highly-stretched UHMW polyethylene yarns, and particularly preferably carbon fiber yarns. In an advantageous embodiment, the multifilament reinforcing yarns in the textile substrate have a mass per unit area of 50 to 500 g/m$^2$. Particularly preferable is a mass per unit area in the range of 100 to 300 g/m$^2$. The multifilament reinforcing yarns preferably consist of 500 to 50000 reinforcing fiber filaments. In order to achieve a particularly good drapeability and a particularly uniform appearance of the textile substrate, the multifilament reinforcing yarns consist particularly preferably of 6000 to 24000 reinforcing fiber filaments.

The linear density of the transverse threads is preferably oriented to the number of reinforcing fiber filaments of the multifilament reinforcing yarns and hence to the linear density of the multifilament reinforcing yarns. In unidirectional woven fabrics, but also generally with multi-layer structures made from the textile substrates, excessive linear densities of the transverse threads result in an increased undulation of the reinforcing yarns. The linear density of the transverse threads should therefore preferably be not more than $\frac{1}{5}$ of the linear density of the multifilament reinforcing yarns. The transverse threads preferably have a linear density in the range of 20 to 400 dtex, and particularly preferably in the range of 50 to 200 dtex.

In order to achieve the least possible undulation but at the same time a sufficient stability of the textile substrate, it is also preferable for the number of transverse threads in the longitudinal direction of the multifilament reinforcing yarns to lie in the range of 0.3 to 6 threads/cm. The number lies particularly preferably in the range of 0.6 to 2 threads/cm. The transverse threads can also run at right angles to the multifilament reinforcing yarns. However, any other conceivable angle between the transverse threads and the multifilament reinforcing yarns is also possible.

The nonwoven of the textile substrate can be a textile fabric made from non-directional short-cut fibers or staple fibers or a random laid nonwoven made from continuous filaments, which has to be bonded, e.g. by the application of temperature and pressure, whereby the filaments melt at the contact points and thus form the nonwoven. As already explained, the nonwoven effects on the one hand a joining of the multifilament reinforcing yarns. At the same time, good drapeability and/or a better infiltration with matrix resin of the fiber preforms produced from the textile substrate are achieved. The nonwoven can, for example, also be a glass mat or a mat of carbon fibers that is then bonded to the flat layer of multifilament reinforcing yarns by means of an adhesive.

The nonwoven is preferably made from a thermoplastic polymer material. Such nonwovens are disclosed, for example, in DE 35 35 272 C2, EP 0 323 571 A1, US 2007/0202762 A1 or US 2008/0289743 A1. With a suitable selection of the thermoplastic polymer material, the nonwoven can function as an agent for increasing the impact strength, and additional means for increasing the impact strength then no longer need to be added to the matrix material as such during the production of the composite-material parts. The nonwoven should thereby still have sufficient stability during the infiltration with matrix material of the fiber preforms produced from the textile substrate but should preferably melt at the subsequent pressing and/or curing temperatures. The thermoplastic polymer material forming the nonwoven therefore preferably has a melting point in the range of 80 to 250° C. Nonwovens made from polyamide have proved to be effective for applications in which epoxy resins are employed as matrix materials.

In a preferred embodiment the nonwoven comprises first and second polymer components whose melting point lies below the melting and decomposition temperature of the second component of the transverse threads, whereby the second polymer component has a lower melting point than that of the first polymer component. The first polymer component is particularly preferably one which is insoluble in epoxy resins, cyanate ester resins or benzoxazine matrix resins or in blends of these matrix resins. It is particularly beneficial if the melting point of the first polymer component is at least as high as the curing temperature of the matrix resins.

As long as they comply with the conditions described above, polymers that are commonly processable into thermoplastic fibers can be used as the first polymer component of the preferred nonwoven used, such as polyamides, polyimides, polyamide-imides, polyesters, polybutadienes, polyurethanes, polypropylenes, polyetherimides, polysulfones, polyethersulfones, polyphenylene sulfones, polyphenylene sulfides, polyetherketones, polyetheretherketones, polyarylamides, polyketones, polyphthalamides, polyphenylene ethers, polybutylene terephthalates or polyethylene terephthalates, or copolymers or blends of these polymers. The first polymer component of the nonwoven is particularly preferably a polyamide homopolymer or a polyamide copolymer or a blend of polyamide homopolymers and/or polyamide copolymers. In particular, the polyamide homopolymer or polyamide copolymer is a polyamide 6, polyamide 6,6, polyamide 6,12, polyamide 4,6, polyamide 11, polyamide 12, or a copolymer based on polyamide 6/12. The first polymer component of the nonwoven preferably has a melting point in the range of 180 to 250° C.

In an advantageous embodiment, the second polymer component of the nonwoven has a melting point in the range of 80 to 140° C. The second polymer component of the nonwoven can be made of common polymers whose melting point lies in this range, such as polyamide homopolymers or copolymers with a low melting point and blends of these polymers, polyolefins, in particular polyethylenes (e.g. PE-LLD, PE-HD), copolyesters, ethylene vinyl acetates, terpolymers such as acrylonitrile-butadiene-styrene copolymers (ABS), or polyhydroxyethers.

In a preferred embodiment, the second polymer component can thereby be soluble in epoxy resins, cyanate ester resins, or benzoxazine matrix resins or in blends of these matrix resins. In this case it is furthermore a particular advantage if the second polymer component is a polymer which reacts chemically with epoxy resins, cyanate ester resins, or benzoxazine matrix resins during the cross-linking of these matrix resins. The second polymer component is then particularly preferably a polyhydroxy ether that completely dissolves in the resin system, especially in epoxy resins, cyanate ester resins or benzoxazine resins, already during the infiltration with these matrix resins of a fiber preform made from the present textile substrate, i.e. during the resin infusion process, for example, and then forms the matrix resin system together with the matrix resin. The first polymer component on the other hand, as already described, does not dissolve in the matrix system and remains as a separate phase both during and after the resin infusion process and also after the curing of the matrix system.

In a further preferred embodiment, the second polymer component is insoluble in epoxy resins, cyanate ester resins, or benzoxazine matrix resins or in blends of these matrix resins. In this case the second polymer component of the nonwoven can be e.g. a polyamide homopolymer or copolymer with a low melting point or a blend of these, or a polyolefin, in particular a polyethylene (e.g. PE-LLD, PE-HD), a copolyester, an ethylene vinyl acetate or a terpolymer such as acrylonitrile-butadiene-styrene copolymer (ABS).

In nonwovens with first and second polymer components, it is a particular advantage if the melting point of the first polymer component of the nonwoven lies in the range of 180 to 250° C. and the melting point of the second polymer component of the nonwoven lies in the range of 80 to 140° C.

The first polymer component melts particularly preferably above the curing temperature of the matrix resin employed. In this way, the first polymer component is bound into the matrix material but always forms a separate phase in the cured matrix resin. This separate phase formed by the first polymer component helps, during curing and in the subsequent component, to limit the propagation of cracks and thus contributes decisively to e.g. the increase in the impact strength.

If the nonwoven comprises a first polymer component with a higher melting point and a second polymer component with a lower melting point, a mobility of the substrate layers relative to one another can be achieved during the production of a fiber preform by heating to a temperature above the melting point of the second polymer component but below the melting point of the first polymer component. The molten second component of the nonwoven functions quasi as a lubricant such that the layers of the reinforcing yarns can slide into the desired position in the preform during the shaping process. During cooling of the preform, the second polymer component then functions as a hot-melt adhesive and fixes the reinforcing layers in their positions.

During the subsequent infiltration of the fiber preform with matrix resin, which generally takes place at temperatures above the melting point of the second component but below the melting point of the first component, the higher melting point of the first polymer component of the nonwoven ensures good permeability for the matrix resin. If the second polymer component is soluble in the matrix resin, as in one of the embodiments described above, this component is then preferably completely dissolved in the matrix resin and thus loses its identity as a separate phase in relation to the matrix resin. The proportion of the second polymer component is therefore then to be attributed to the matrix material, and the proportion of matrix resin to be infiltrated can be reduced by the proportion of the second polymer component. As a result, high fiber volume proportions of the reinforcing fibers can be set in the resulting part, and hence the mechanical strength properties can be held at a high level. At the curing temperature of the matrix resin, i.e. the epoxy resin, cyanate ester resin or benzoxazine resin, the second polymer component in a particularly preferred embodiment reacts chemically with the curing matrix resin via crosslinking reactions and thus becomes an integral part of a homogeneous matrix.

In the event that the second polymer component is not soluble in epoxy resins, cyanate ester resins or benzoxazine matrix resins or in blends of these matrix resins, the first polymer component acts, as described above, as a lubricant allowing a mobility of the substrate layers relative to one another so that the layers of the reinforcing yarns can slide into the desired position during the shaping into the preform, and on cooling of the preform acts as a hot-melt adhesive, fixing the reinforcing layers in their position. During the infiltration of the matrix resin and its subsequent curing, its identity as a phase independent of the matrix resin is retained, however, so that in this case the second polymer component, as well as the first polymer component, reduces the propagation of cracks and thus contributes e.g. to the improvement in the impact strength.

In the preferred case that the nonwoven has a first polymer component with a higher melting point and a second polymer component with a lower melting point, it can consist of a mixture of monocomponent fibers of the respective polymer components, i.e. it can be a hybrid nonwoven. The nonwoven can, however, also consist of bi-component fibers, for example, of core/sheath fibers, wherein the core of the fibers is made from the first polymer component with the higher melting point and the sheath is made from the second polymer component with the lower melting point. During the processing of the textile substrates with such hybrid nonwovens or bi-component nonwovens into fiber preforms, which also requires e.g. a shaping of the textile substrates, a suitable application of heat during the shaping at temperatures above the melting point of the nonwoven component with the lower melting point but below the melting point of the nonwoven component with the higher melting point can produce a good shapeability, and after cooling, a good stabilization and fixation of the shaped composite. Similarly to a nonwoven made from bi-component fibers, the nonwoven can also be made e.g. from a random laid composite of fibers made from the first polymer component, wherein the second polymer component has been applied to the fibers of the first polymer component e.g. by spraying or coating. The coating can, for example, result from an impregnation with a dispersion or solution of the second polymer component, wherein after the impregnation the liquid portion of the dispersion, or the solvent, is removed. It is likewise possible that a nonwoven constructed from fibers made from the first polymer component contains the second polymer component in the form of fine particles embedded between the fibers of the first polymer component.

The nonwoven comprising first and second polymer components is preferably a hybrid nonwoven, i.e. a nonwoven made from a mixture of monocomponent fibers with differing melting points. As already described, the first polymer component with the higher melting point particularly preferably has a melting point in the range of 180 to 250° C. At such temperatures, the part of the nonwoven that consists of the first polymer component melts only above the temperatures that as a rule prevail during the injection of the matrix resin. Because the first polymer component thus does not yet melt at the resin injection temperature, a good dimensional stability of the textile substrate is guaranteed in this phase.

In view of the characteristics of the composite parts produced using the present textile substrates, especially in view of their impact strength and their matrix content, it is advantageous if the nonwoven contains the first polymer component in a proportion of 60 to 80 wt. % and the second polymer component in a proportion of 20 to 40 wt. %. In all, it is preferable if the nonwoven present in the present textile substrate has a mass per unit area in the range of 5 to 25 $g/m^2$ and particularly preferably a mass per unit area in the range of 5 to 15 $g/m^2$.

Particularly in cases where the nonwoven of the textile substrate comprises only one polymer component with a higher melting point, i.e. for example comprises only one polymer component whose melting point lies in the range of 180 to 250° C., the textile substrate in a preferred embodiment furthermore comprises a binder material on at least one of the surfaces of the flat layer of multifilament reinforcing yarns, whose main component is a thermoplastic polymer or a bisphenol A-based epoxy resin that is solid at room temperature, and which is applied discontinuously to the flat layer of the multifilament reinforcing yarns and is adhesively bonded to the multifilament reinforcing yarns. A discontinuous application is understood here as an application in which the binder material is applied to the surface pointwise, in the form of lines or in some other way without creating a closed layer of the binder material. The binder material is preferably used in a concentration of 1 to 5 wt. % of the mass per unit area of the multifilament reinforcing yarns.

In a particularly preferred embodiment of the textile substrate, the binder material is based on a powder material and is applied pointwise to the flat layer of the multifilament reinforcing yarns. This can be achieved by scattering the powdered binder material onto the surface of the layer of multifilament reinforcing yarns arranged alongside and parallel to one another and fixing it to the surface by melting.

Polyvinyl acetate, polycarbonate, polyacetate, polyphenylene oxide, polyphenylene sulfide, polyallylate, polyester, polyamide, polyamide imide, polyimide, polyether imide, polysulfone, polyether sulfone, polyether etherketone, polyaramid, polybenzimidazole, polyethylene, polypropylene or cellulose acetate can be preferably used as thermoplastic polymers for the binder material.

The melting point of the binder material preferably lies in the range of 80 to 120° C. The binder material can thereby have purely the function of joining layers of the textile substrate laid on top of one another during the production of fiber preforms by heating to a temperature above the melting point of the binder material and subsequent cooling, and of fixing them relative to one another. The binder material can furthermore contribute to a stabilization of the fiber preform if, for example, a deformation of the layers of the textile substrate has taken place during the shaping of the fiber preform. It is finally also possible, however, that the binder material is selected such that it contributes to an improvement in the mechanical properties of the composite-material part made from the fiber preform by, for example, improving the impact strength of the part. It is an advantage here if the binder material is a thermoplastic material with a high toughness or a blend of such a thermoplastic polymer with a bisphenol A-based epoxy resin that is solid at room temperature.

In view of its specific structure, the present substrate distinguishes itself by a good drapeability and fixability of the substrate layers in the fiber preform, by a good permeability during the infiltration with matrix resin during production of the part from the preform, and in that it can be used to produce parts with high mechanical strengths and high impact strength. The present invention thus applies in particular also to a fiber preform for the production of a composite-material part comprising a textile substrate, according to the present invention.

The joining of the multifilament reinforcing yarns with the transverse threads and at the same time with the nonwoven, and possibly with the binder material, in the form of an adhesive bond gives the textile substrate a high level of dimensional stability, since the adhesive bonds result in an excellent fixing of the multifilament reinforcing yarns relative to one another. This allows not only textile substrates to be produced in which the multifilament reinforcing yarns are used in a straight form arranged alongside and parallel to one another but also textile substrates with a curved form. A preferred embodiment therefore relates to a textile substrate in which the at least one flat layer of multifilament reinforcing yarns arranged alongside and parallel to one another has a curved contour in which the multifilament reinforcing yarns are arranged parallel to a circumferential direction of the curved contour, each multifilament reinforcing yarn follows its own trajectory along the circumferential direction of the curved contour, and the trajectories of the individual multifilament reinforcing yarns have a common center of curvature.

In such a textile substrate with a curved form or contour, the multifilament reinforcing yarns run parallel to a direction (0° direction) along a circumferential direction of the curved contour. By contrast with composites in which the multifilament reinforcing yarns are arranged alongside and parallel to one another and have a straight, linear path, the multifilament reinforcing yarns in the textile substrates with a curved form are also arranged alongside and parallel to one another but follow different curved trajectories with a common center of curvature. The transverse threads run here also in a direction intersecting the multifilament reinforcing yarns and transverse to the multifilament reinforcing yarns. Due to the high dimensional stability and as a result of the design of the present textile substrates, in particular due to the two-component core/sheath structure of the transverse threads, this curved form is also retained during the subsequent processing steps to produce the fiber preform or the composite-material part. A further stabilization of textile substrates is achieved here in which the nonwoven of thermoplastic polymer material comprises a first polymer component and a second polymer component which have the properties described above.

The invention claimed is:

1. Textile substrate made from reinforcing fibers for the production of composite-material preforms comprising a unidirectional composite including at least one flat layer of multifilament reinforcing yarns arranged alongside and parallel to one another,
wherein
the multifilament reinforcing yarns arranged alongside one another are joined together by transverse threads,
a nonwoven of thermoplastic polymer material is arranged on the at least one flat layer of multifilament reinforcing yarns and is adhesively bonded to the flat layer of the multifilament reinforcing yarns, and
the transverse threads have a core/sheath structure with a first component forming the sheath and a second component forming the core, wherein the first component has a lower melting point than the second component, the first component is a fusible thermoplastic polymer material, and the multifilament reinforcing yarns arranged alongside one another are joined together via the first component of the transverse threads by meltbonding; wherein the transverse threads have a linear density in the range of 20 to 50 dtex and the number of transverse threads in the longitudinal direction of the multifilament reinforcing yarns lies in the range of 0.6 to 2 threads/cm.

2. Textile substrate according to claim 1, wherein the first component of the transverse threads has a melting point in the range of 70 to 150° C.

3. Textile substrate according to claim 2, wherein the first component of the transverse threads is a polyamide homopolymer or polyamide copolymer or a blend of polyamide homopolymers and/or polyamide copolymers.

4. Textile substrate according to claim 1, wherein the second component of the transverse threads has a melting point above 200° C.

5. Textile substrate according to claim 4, wherein the core of the transverse threads consists of a polyester.

6. Textile substrate according to claim 1, wherein the nonwoven has a mass per unit area in the range of 5 to 25 g/m.

7. Textile substrate according to claim 1, wherein the thermoplastic polymer material of nonwoven comprises two polymer components, where a second polymer component of the nonwoven has a lower melting point than a first polymer component of the nonwoven, wherein
the first polymer component of the nonwoven has a melting point that lies below the melting or decomposition point of the second component of the transverse threads.

8. Textile substrate according to claim 7, wherein the first polymer component of the nonwoven has a melting point in the range of 180 to 250° C. and the second polymer component of the nonwoven has a melting point in the range of 80 to 140° C.

9. Textile substrate according to claim 7, wherein the first polymer component of the nonwoven is a polyamide homopolymer or polyamide copolymer or a blend of polyamide homopolymers and/or polyamide copolymers.

10. Textile substrate according to claim 1, wherein on at least one of the surfaces of the flat layer of the multifilament reinforcing yarns, the textile substrate further comprises:
a binder material whose main component is a thermoplastic polymer or a bisphenol A-based epoxy resin that is solid at room temperature, and which is applied discontinuously to the flat layer of the multifilament reinforcing yarns and is adhesively bonded to the multifilament reinforcing yarns.

11. Textile substrate according to claim 10, wherein the binder material has a melting point in the range of 80 to 120° C.

12. Textile substrate according to claim 1, wherein the multifilament reinforcement yarns are carbon fiber, glass fiber, aramid yarns, or UHMW polyethylene yarns.

13. Textile substrate according to claim 1, wherein the at least one flat layer of multifilament reinforcing yarns arranged alongside and parallel to one another has a curved contour in which the multifilament reinforcing yarns are arranged parallel to a circumferential direction of the curved contour, each multifilament reinforcing yarn follows its own trajectory along the circumferential direction of the curved contour, and the trajectories of the multifilament reinforcing yarns have a common center of curvature.

14. Fiber preform for the production of composite-material parts, wherein it comprises a textile substrate according to claim 1.

15. Textile substrate made from reinforcing fibers for the production of composite-material preforms comprising a unidirectional composite including at least one flat layer of multifilament reinforcing yarns arranged alongside and parallel to one another,
wherein
the multifilament reinforcing yarns arranged alongside one another are joined together by transverse threads,
a nonwoven of thermoplastic polymer material is arranged on the at least one flat layer of multifilament reinforcing yarns and is adhesively bonded to the flat layer of the multifilament reinforcing yarns, and
the transverse threads have a core/sheath structure with a first component forming the sheath and a second component forming the core, wherein the first component has a lower melting point than the second component, the first component is a fusible thermoplastic polymer material, and the multifilament reinforcing yarns arranged alongside one another are joined together via the first component of the transverse threads by meltbonding; wherein the transverse threads have a linear density in the range of about 20 to about 50 dtex and the number of transverse threads in the longitudinal direction of the multifilament reinforcing yarns lies in the range of 0.6 to 2 threads/cm.

16. The textile substrate according to claim 15, wherein the first component of the transverse threads has a melting point in the range of 70 to 150° C.

17. The textile substrate according to claim 16, wherein the first component of the transverse threads is a polyamide homopolymer or polyamide copolymer.

18. Textile substrate according to claim 15, wherein the second component of the transverse threads has a melting point above 200° C.

19. The textile substrate according to claim 18, wherein the second component of the transverse threads consists of a polyester.

* * * * *